May 27, 1952     O. R. SMITH     2,598,076
ARC WELDING MECHANISM
Filed July 17, 1950     2 SHEETS—SHEET 1
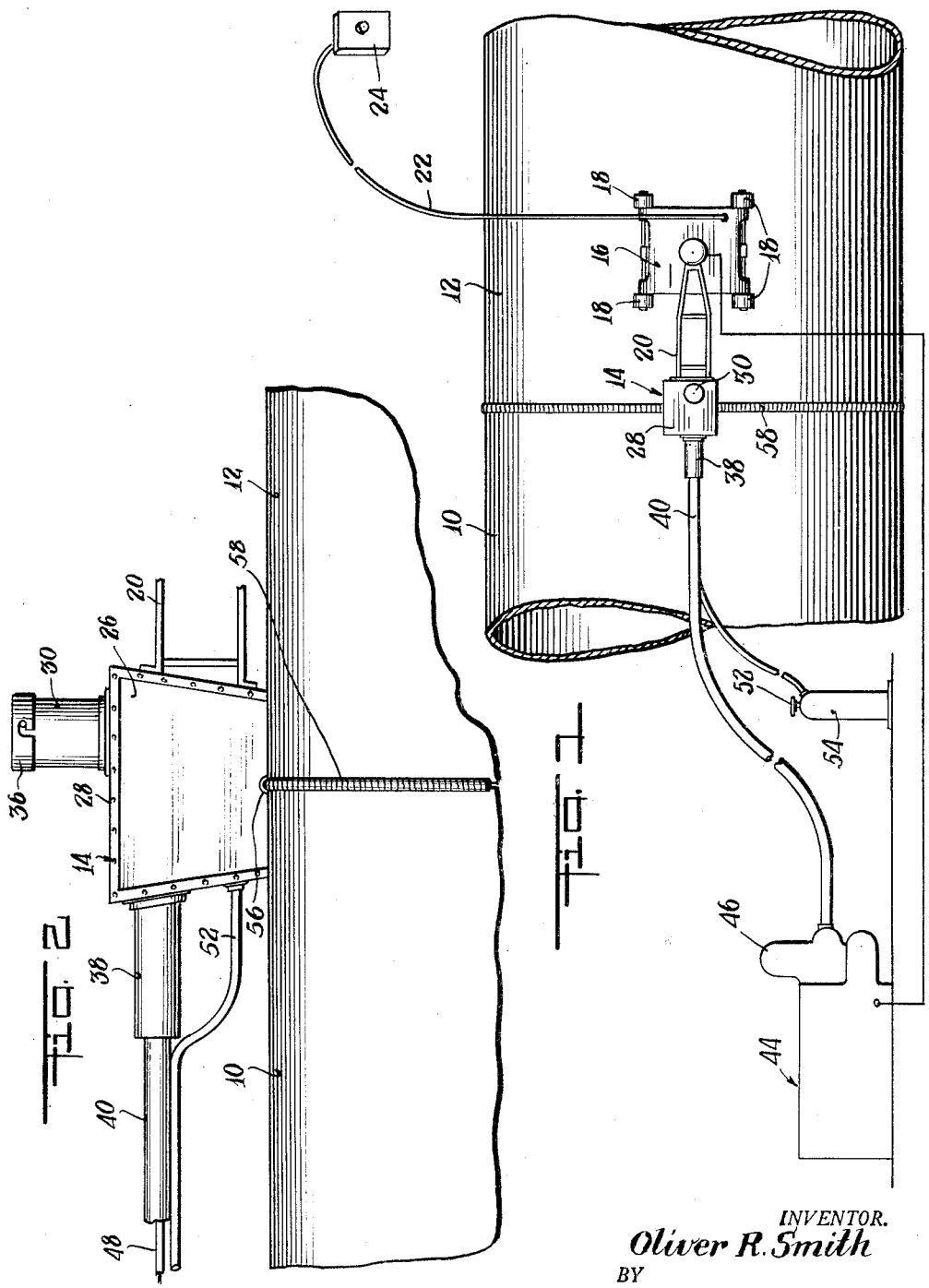
INVENTOR.
Oliver R. Smith
BY
Charles E. Lightfoot
ATTORNEY

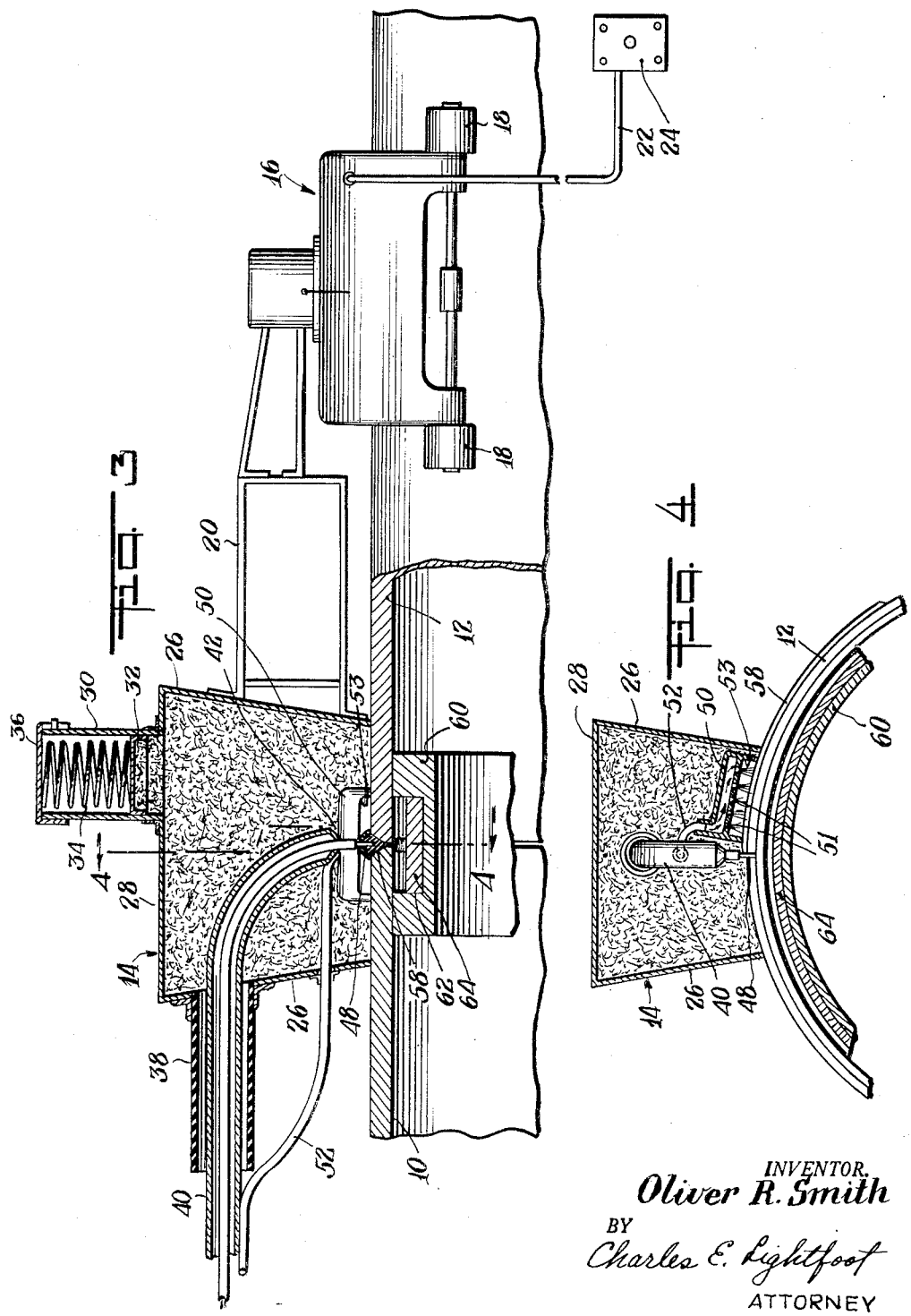

Patented May 27, 1952

2,598,076

UNITED STATES PATENT OFFICE 2,598,076

ARC WELDING MECHANISM

Oliver R. Smith, Fort Worth, Tex.

Application July 17, 1950, Serial No. 174,187

6 Claims. (Cl. 219—8)

This invention relates to arc welding mechanism, and more particularly to welding apparatus of the type wherein the welding takes place beneath a molten flux formed in the welding zone during the welding operation.

While not limited to such use, the invention finds particular application in the production of butt welded joints, and has been found to be especially useful in welding together sections of pipe of large diameter, such as the pipes used in the construction of pipe lines for the transportation of gas and oil.

Heretofore, in the construction of pipe lines for the transportation of oil and gas, it has been customary to join the pipe sections by ordinary hand welding methods, and because of the difficulty of carrying out such hand welding operations, the sections of pipe are sometimes welded in pairs before being positioned in the line, thus reducing by half the number of joints which must be made in situ. For this purpose the sections are rotatably supported in pairs in end abutting relation on a heavy supporting structure, and slowly rotated thereon while the joint is being welded by hand or otherwise. The construction of pipe lines by this method requires the use of heavy pipe supporting equipment and the expenditure of much unnecessary labor in transporting such equipment from place to place, which results in adding greatly to the cost of construction.

It is an important object of this invention to provide welding mechanism whereby the welding of pipe joints may be rapidly accomplished with the pipe sections in situs and without the necessity for rotating the work while the same is being welded.

A further object of the invention is the provision of welding mechanism wherein the welding takes place beneath a molten bath of flux formed in the welding zone by a process sometimes called submerged melt electric welding.

Another object of the invention is to provide welding mechanism whereby the welding may take place in any position of the mechanism without displacement of the molten metal from the welding zone due to gravity.

A further object of the invention is the provision of welding mechanism wherein means is provided for the exclusion of air from the zone of the weld and the protection of the metal of the weld against oxidation while in a molten condition.

Another object of the invention is to provide welding mechanism adapted to be positioned on the work and having means for automatically moving the mechanism along the zone of the weld and at the same time automatically feeding the welding electrode and flux material to the welding zone in accordance with the speed with which the weld is formed.

Another object of the invention is to provide welding mechanism which is easily portable and which may be automatically operated to produce welds of uniform quality, thus eliminating much of the hand labor heretofore necessary in carrying out welding operations of the kind referred to.

A still further object of the invention is the provision of welding mechanism of simple design and rugged construction capable of withstanding the extreme conditions of exposure and hard usage to which devices of this character are customarily subjected.

The invention will best be understood from the following detailed description, constituting a specification of the same when taken in conjunction with the annexed drawings, wherein—

Figure 1 is a side elevational view showing the welding mechanism applied to the work and indicating the manner in which it is operated;

Figure 2 is a fragmentary side elevational view showing the invention in position on the work in position for carrying out the welding operation;

Figure 3 is a side elevational view partly in cross-section, showing the relationship of the various parts of the mechanism, and;

Figure 4 is a cross-sectional view taken along line 4—4 of Figure 3.

The invention, briefly stated, comprises a container structure mounted for movement along the line of the weld and adapted to deliver flux material to the welding zone, there being means associated with the container for feeding electrode material through the container to the welding zone and means moveable with the container for applying a coolant to the molten flux immediately after the welding has been accomplished.

Referring now to the drawings in greater detail, the invention is shown in its application to the welding together of two sections of pipe indicated by the numerals 10 and 12, respectively. The pipe sections are preferably beveled at their ends in the customary manner for forming a butt weld, and are supported in end abutting relation in any convenient manner.

The welding mechanism includes a container 14 for flux material adapted to be positioned in proximity to the abutting ends of the pipe sections, and supported for movement along the welding zone on a carriage of conventional design generally indicated at 16. The carriage 16 is provided with magnetized wheels 18 whereby the same is firmly held on one section of the pipe but may travel freely about the circumference thereof. A supporting frame 20 is attached to the carriage 16 and carries the container 14 for movement with the carriage. The frame 20 may be adjustably secured to the carriage by conventional means, whereby the container may be made accurately to follow the zone of the weld as the carriage travels about the pipe. The carriage may be motor driven, and the movement of the carriage may be regulated by suitable electrical control means, such as the electric cable 22 connected to a suitable source of electric current through the control box 24.

The container 14 has an opening at the bottom, through which the flux material may reach the welding zone, and is preferably formed with upwardly diverging sides 26, and a closed top 28. A tubular extension 30 may be provided at the top of the container, within which a follower 32 is moveably disposed, and a coil spring 34 located above the follower and beneath a removeable cap 36 urges the follower downward to exert pressure on the flux material in the container.

The container preferably has a protector sleeve 38 of rubber or the like attached to one side thereof in communication with an opening, through which an electrode feed tube 40 extends into the container. The portion of the tube 40 within the container is bent to position the open end 42 of the tube centrally of the container and spaced somewhat above the bottom opening thereof. The electrode tube is of flexible character and extends to a welding machine indicated generally at 44, and which is of conventional construction, including an electric generator and having automatic electrode holding and feeding mechanism of well known type indicated at 46. The welding machine is provided with conventional electric current generating means and has the usual control mechanism therefor. An electrode 48 passes through the tube 40 and out of the open end 42 thereof and is adapted to be automatically fed to the welding zone in accordance with welding requirements.

Within the container and in close proximity to the end 42 of the electrode tube a cooling device is positioned, which may be in the form of a hollow head 50 provided with a plurality of perforations 51 in its lower surface. The head 50 preferably has its bottom recessed as seen at 53 in Figure 4, so that the openings 51 are suitably spaced from the bead of the weld. The head 50 may be carried by a flexible tube 52 in communication therewith and passing out through the side of the container for connection to a source of a suitable coolant, such as carbon dioxide, which may be contained in the usual gas cylinder or bottle 54.

A suitably shaped notch 56 may be provided in one or more walls of the container for the free passage therethrough of the flux covered bead of the weld indicated by 58, after the same has been formed in the welding operation.

A flux material is used which is preferably in the nature of finely divided silica or a silicate having the property of forming a molten mass or liquid bath under the influence of the heat of the welding operation, beneath which the metal of the weld is melted, and which hardens to a glass-like layer upon cooling.

In aligning the abutting ends of the pipe sections to be welded an expandible clamping device, such as that indicated at 60 is inserted in the ends of the sections, and expanded therein to maintain the ends in proper alignment for welding. The clamp may take the form of an expandible metal ring having a circumferential groove 62 located beneath the weld, to permit the molten metal to flow between the abutting ends and form an interior bead, and a liner 64 of suitable material such as heat resistant metal may be positioned in the groove 62, to prevent injury to the ring by the heat of the molten metal.

In making use of the above described welding mechanism the container 14 is positioned over the joint to be welded and supported on the pipe or other work by the carriage 16, which is held in place by the magnetic wheels 18. The container is then filled with flux material in fine granular or other suitable form, the extension 30 being also filled and the follower 32 positioned therein and pressed down upon the flux by the spring 34 held in position by cap 36 to compact the flux about the welding zone. The electrode 48 is then inserted through the tube 40 into engagement with the work. Upon turning on the electric current, contact is established between the electrode and the work and the electrode is then automatically fed to the work as the carriage moves carrying the container along the work with the electrode in the welding zone closely following the line of the weld. As the welding operation proceeds the flux is fused by the heat of the arc and forms a molten bath in the welding zone, beneath which the metal is deposited in a molten condition to form the weld.

At the commencement of the welding operation the coolant from the gas cylinder 54 is turned on and passes through the tube 52 and into the cooling head 50, whence it passes out through the holes in the head into cooling contact with the heated flux. The molten flux is thus immediately solidified after the molten metal has been deposited and serves to hold the molten metal of the weld against displacement until it becomes solidified. Thus, in using the mechanism to weld the joints of pipes of large diameter, the welding can be carried out automatically, about the entire circumference of the members being joined without the necessity for rotating the members, and with no danger of displacement of the molten metal by gravity before it becomes solidified. Any of the flux material which escapes can be recovered for subsequent use, and the flux coating on the bead of the weld can also be removed and suitably treated for reuse.

Due to the compacting of the flux in the container by the follower 32 under the influence of the spring 34, the flux is held in proximity to the welding zone, even when the welding is taking place along a vertically disposed portion of the joint, or when the container is inverted in welding an overhead portion of the joint.

It will be seen that in the use of the welding mechanism as described above, the welding takes place beneath a bath of molten flux which substantially completely excludes air and produces a clean and uniform deposit free from defects. The coolant, when in the form of carbon dioxide or other non-oxidizing medium, serves to further exclude oxygen from the weld, and also displaces air from the surrounding unfused flux material, thus aiding in the production of a uniform coating of flux on the bead.

The invention thus provides welding mechanism of simple construction which is easily portable, efficient in use, and whereby welds of any length can be easily and rapidly completed, with a minimum of skill on the part of the operator and without the necessity of moving the parts to be joined.

While the invention has been disclosed in connection with a specific embodiment, it is not confined to the particular structure or mode of use described, but is capable of more general application wherever the conditions make it feasible to employ welding apparatus of this type. Numerous changes in the structure and arrangement of the various parts may, of course, be made without departing from the spirit of the invention and within the scope of the appended claims.

Having thus fully disclosed the invention, what is claimed as new and desired to secure by Letters Patent is:

1. In arc welding mechanism, a flux container having an opening and adapted to be positioned on work to be welded with the flux covering the welding zone of the work, means supporting said container for movement along the welding zone, electrode means moveable through the flux into contact with the work to form a molten deposit of weld metal and flux in said zone as the container moves along the zone, and means disposed adjacent the electrode means for directing a coolant into contact with said deposit to solidify said deposit.

2. In arc welding mechanism, a flux container having an opening and adapted to be supported for movement on the work along the welding zone with the opening positioned to deliver flux to said zone, electrode means carried by the container and moveable toward and along said zone to form a molten deposit of weld metal and flux in said zone, and coolant delivering means carried by the container for movement along said zone and positioned to direct coolant into contact with said deposit to solidify said deposit.

3. In arc welding mechanism, a flux container having an opening and adapted to be supported for movement on the work along the welding zone with the opening positioned to deliver flux to said zone, electrode means carried by the container and moveable toward and along said zone to form a molten deposit of weld metal and flux in said zone, and means for delivering a coolant to said deposit adjacent said electrode means to solidify said deposit.

4. In arc welding mechanism, a flux container having an opening and adapted to be supported for movement on the work along the welding zone with the opening positioned to deliver flux to said zone, electrode means carried by the container and moveable toward and along said zone to form a molten deposit of weld metal and flux in said zone, and coolant delivering means carried by said container and moveable therewith along said zone to deliver coolant to said deposit adjacent said electrode means.

5. In arc welding mechanism, a flux container having an opening and adapted to be supported for movement on the work along the welding zone with the opening positioned to deliver flux to said zone, an electrode carried by said container and moveable therein, means in the container for guiding said electrode into said zone to form a molten deposit of weld metal and flux in said zone, and means in said container for delivering a coolant to said deposit adjacent said electrode.

6. In arc welding mechanism, a flux container having an opening and adapted to be supported for movement on the work along the welding zone with the opening positioned to deliver flux to said zone, means in the container for moving flux therein toward said opening, electrode means carried by the container and moveable toward said zone to form a molten deposit of weld metal and flux in said zone, and coolant delivering means in the container in position to direct coolant to said deposit adjacent said electrode means.

OLIVER R. SMITH.

REFERENCES CITED

The following references are of record in the file of this patent:

UNITED STATES PATENTS

| Number | Name | Date |
|---|---|---|
| 1,826,186 | Morton | Oct. 6, 1931 |
| 1,938,819 | Eskilson | Dec. 12, 1933 |
| 2,063,467 | Southgate | Dec. 8, 1936 |
| 2,211,424 | Holslag | Aug. 13, 1940 |
| 2,402,938 | Stringham | June 25, 1946 |
| 2,444,834 | Landis et al. | July 6, 1948 |
| 2,478,525 | Cutrer | Aug. 9, 1949 |
| 2,504,867 | Muller | Apr. 18, 1950 |
| 2,510,204 | Baird | June 6, 1950 |
| 2,510,205 | Baird | June 6, 1950 |